(12) United States Patent
Afaneh

(10) Patent No.: US 12,552,435 B2
(45) Date of Patent: Feb. 17, 2026

(54) ELECTRIC MOTOR SHOPPING CART

(71) Applicant: Anas Afaneh, Etobicoke (CA)

(72) Inventor: Anas Afaneh, Etobicoke (CA)

( * ) Notice: Subject to any disclaimer, the term of this patent is extended or adjusted under 35 U.S.C. 154(b) by 276 days.

(21) Appl. No.: 18/512,492

(22) Filed: Nov. 17, 2023

(65) Prior Publication Data

US 2025/0162637 A1    May 22, 2025

(51) Int. Cl.
*B62B 5/04*   (2006.01)
*B62B 3/14*   (2006.01)
*B62B 5/00*   (2006.01)

(52) U.S. Cl.
CPC .......... *B62B 5/0069* (2013.01); *B62B 3/1424* (2013.01); *B62B 5/0423* (2013.01)

(58) Field of Classification Search
CPC .... B62B 5/0069; B62B 5/0423; B62B 3/1424
See application file for complete search history.

(56) References Cited

U.S. PATENT DOCUMENTS

2017/0327142 A1\* 11/2017 Hannah ................. B62B 5/0096
2019/0308652 A1\* 10/2019 Green ................... B60T 8/1701

\* cited by examiner

*Primary Examiner* — Bryan A Evans

(57) ABSTRACT

A motorized shopping cart is disclosed herein and includes a shopping cart, a wheel assembly attached to the shopping cart, a drive assembly, accelerator and brake assembly in communication with the wheel assembly, a GPS module, a direction sensing module, a feedback module, a controller and in some embodiments, a collision module. The GPS module detects a location of the shopping cart relative to one or more boundaries and the direction sensing module detects a direction of travel of the shopping cart within a store. If the shopping cart moves past the boundary or in an incorrect direction of travel, the controller automatically applies the brake assembly to cease movement of the shopping cart and simultaneously causes the feedback module to vibrate at least a portion of the shopping cart. In some embodiments, if a collision is imminent, the controller activates one or more response measures for collision avoidance.

20 Claims, 8 Drawing Sheets

ELECTRIC MOTOR SHOPPING CART

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of shopping carts of existing art and more specifically relates to motorized shopping carts.

RELATED ART

Shopping carts, also known as trolleys or grocery carts, are used in retail stores and supermarkets to enable customers to conveniently carry and organize their purchases while shopping. Typically constructed of metal or plastic, shopping carts feature a basket-like structure mounted on wheels for easy mobility and a handlebar for maneuvering the shopping cart.

However, there are some challenges associated with shopping carts in the current art, especially for individuals with physical limitations or disabilities. For example, maneuvering heavy carts requires the use of hands and upper body strength, potentially causing strain or discomfort, especially for those with mobility issues. This can be inconvenient and physically demanding, making it difficult for some individuals to effectively navigate and shop.

Motorized shopping carts have been introduced into the market as an attempt to enhance the shopping experience, particularly for those who may struggle with mobility. However, their effectiveness has been hindered by various drawbacks. Particularly, these motorized carts are susceptible to accidents, collisions, or even getting lost within the store due to user inexperience or issues with the controllers.

Further, a significant challenge arises from users not returning these motorized carts to designated areas, making it difficult for others to access them and contributing to store clutter. Another issue is the unfortunate reality of cart theft; individuals may take these motorized carts outside the store premises, leading to losses for the retail establishment and creating inconvenience for other customers who genuinely need the assistance of motorized carts while shopping. Thus, a suitable solution is desired.

SUMMARY OF THE INVENTION

In view of the foregoing disadvantages inherent in the known shopping cart art, the present disclosure provides a novel electric motor shopping cart. The general purpose of the present disclosure, which will be described subsequently in greater detail, is to provide a shopping cart that is motorized, thereby enabling easy mobility throughout a store, and enables automatic locking of wheels of the cart in response to the occurrence of particular events, such as wrong-way travel in the store, a breach of a predetermined boundary outside of the store, and/or an impending collision.

A motorized shopping cart is disclosed herein. The motorized shopping cart may, in some embodiments, include a shopping cart, a wheel assembly, a smoke detection module, a display screen, a drive assembly, a brake assembly, a feedback module, a GPS module, a direction sensing module and a controller.

The shopping cart may include a basket, a handle at a rear side of the basket and a base below the basket. The wheel assembly may include four wheels attached at each corner of the base for propelling the shopping cart. The drive assembly may be in communication with the wheel assembly and configured to drive the wheel assembly to propel the shopping cart; and the brake assembly may be in communication with the wheel assembly and configured to lock the wheel assembly to cease movement of the shopping cart.

The feedback component may be coupled to the shopping cart and configured to vibrate at least a portion of the shopping cart (e.g., the handle, the basket, the wheels, etc.). The GPS module may be coupled to the shopping cart and configured to determine a location of the shopping cart relative to a predetermined boundary. The direction sensing module may be coupled to the shopping cart and configured to determine a direction of travel of the shopping cart through a store.

The controller may be coupled to the shopping cart and configured to receive data from the GPS module and the direction sensing module, respectively. In response to either one of movement of the shopping cart past the predetermined boundary (as determined via data from the GPS module) and/or incorrect direction of travel of the shopping cart (as determined via data from the direction sensing module), the controller may be configured to simultaneously cause the brake assembly to lock the wheel assembly to cease movement of the shopping cart and cause the feedback module to vibrate the shopping cart (or at least a portion thereof).

According to another embodiment, the motorized shopping cart may further include a fold-out seat and at least one fold-out step. The fold-out seat may be pivotably attached to the shopping cart toward the rear side of the basket and configured to move between a folded seat position and an unfolded seat position. In the unfolded seat position, the fold-out seat may be unfolded at the rear side of the basket and enables a user to sit thereon. The at least one fold-out step may be pivotably attached to the shopping cart underneath the basket and configured to move between a folded step position and an unfolded step position. In the unfolded step position, the at least one fold-out step may be unfolded at a side of the basket, enabling the user to place a foot thereon.

In some embodiments, a collision module may also be provided and configured to detect an imminent collision. Accordingly, the controller may be configured to activate one or more response measures for collision avoidance, such as braking, acceleration, deceleration, changing direction, etc.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an electric motor shopping cart, constructed and operative according to the teachings of the present disclosure.

The various embodiments of the present invention will hereinafter be described in conjunction with the appended drawings, wherein like designations denote like elements.

DETAILED DESCRIPTION

Figure 1:
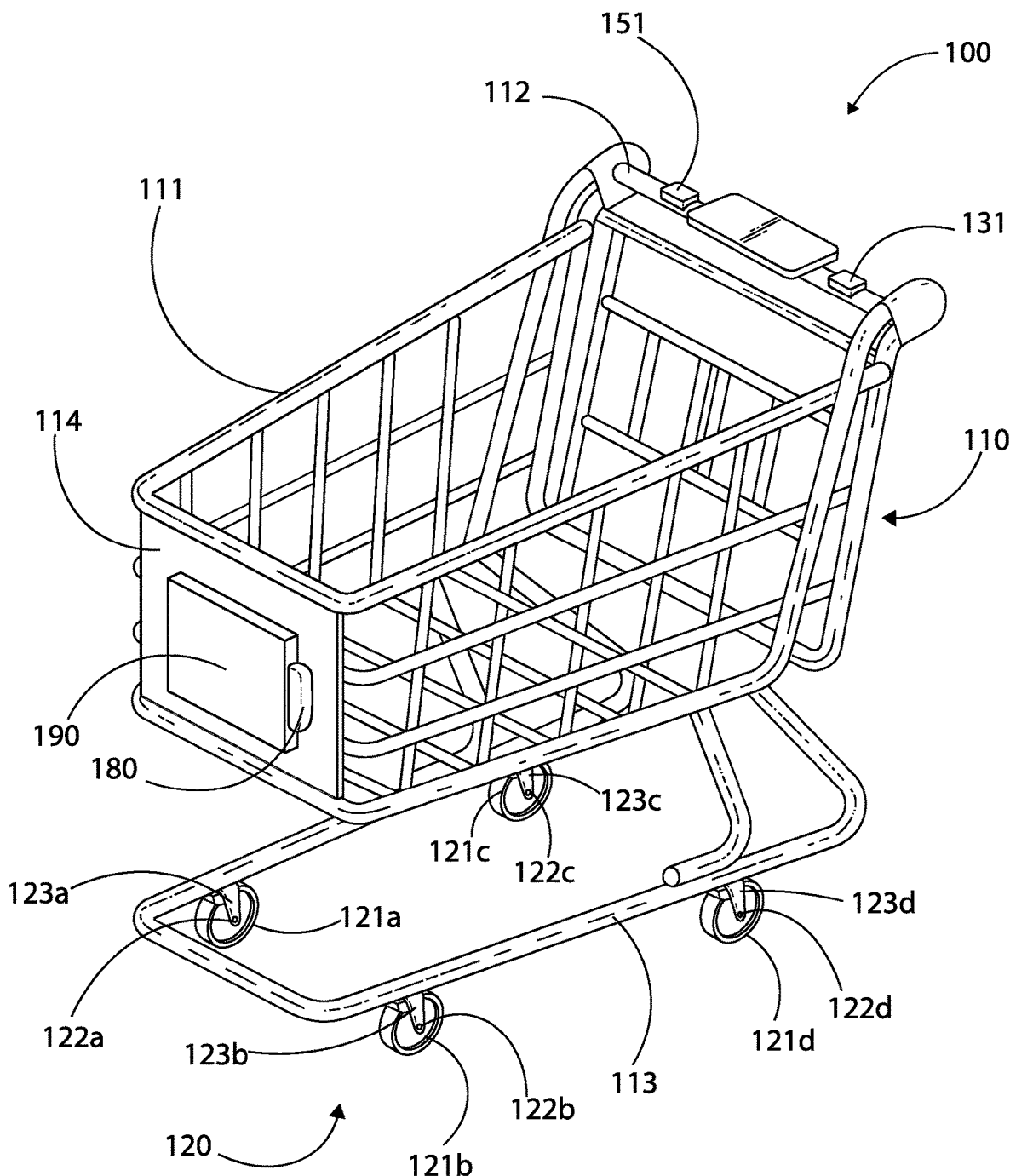
FIG. 1 is a front perspective view of a motorized shopping cart, according to an embodiment of the disclosure.

As discussed above, embodiments of the present disclosure relate to an electric motor shopping cart. Generally, the electric motor shopping cart may, in some embodiments, include a shopping cart, a brake, a throttle, a fold-out seat, at least one fold-out step, motorized wheels, a smoke detector, and a screen for advertising and announcements.

Referring now more specifically to the drawings by numerals of reference, there is shown in FIGS. 1-8, various views of a motorized shopping cart 100 according to one or more embodiments of the present disclosure. As shown here, the motorized shopping cart 100 may include a frame comprising a basket 111 and a base 113 below the basket 111. A handle 112 may be located at a rear side of the basket 111.

Further, a wheel assembly 120 may be attached to the frame. Particularly, the wheel assembly 120 may include four wheels 121a, 121b, 121 c, 121d attached at each corner of the base 113 (i.e., one wheel at each corner) for propelling the shopping cart 110. As shown here, in some embodiments, each of the four wheels 121a, 121b, 121c, 121d may be (but are not limited to) caster-type wheels. Particularly, each of the four wheels 121a, 121b, 121c, 121d may include a pair of brackets 123a, 123b, 123c, 123d and an axle 122a, 122b, 122c, 122d connecting the pair of brackets 123a, 123b, 123c, 123d and around which the wheels 121a, 121b, 121c, 121d rotate.

As shown in these figures, the motorized shopping cart 100 may include a shopping cart 110, a drive assembly 130, a controller 140, a brake assembly 150, a GPS component 161, a direction sensing module 162, a feedback module 170, a smoke detection module 180 and a display screen 190. Power may be supplied to the motorized shopping cart 100 via integral rechargeable batteries.

Figure 2:
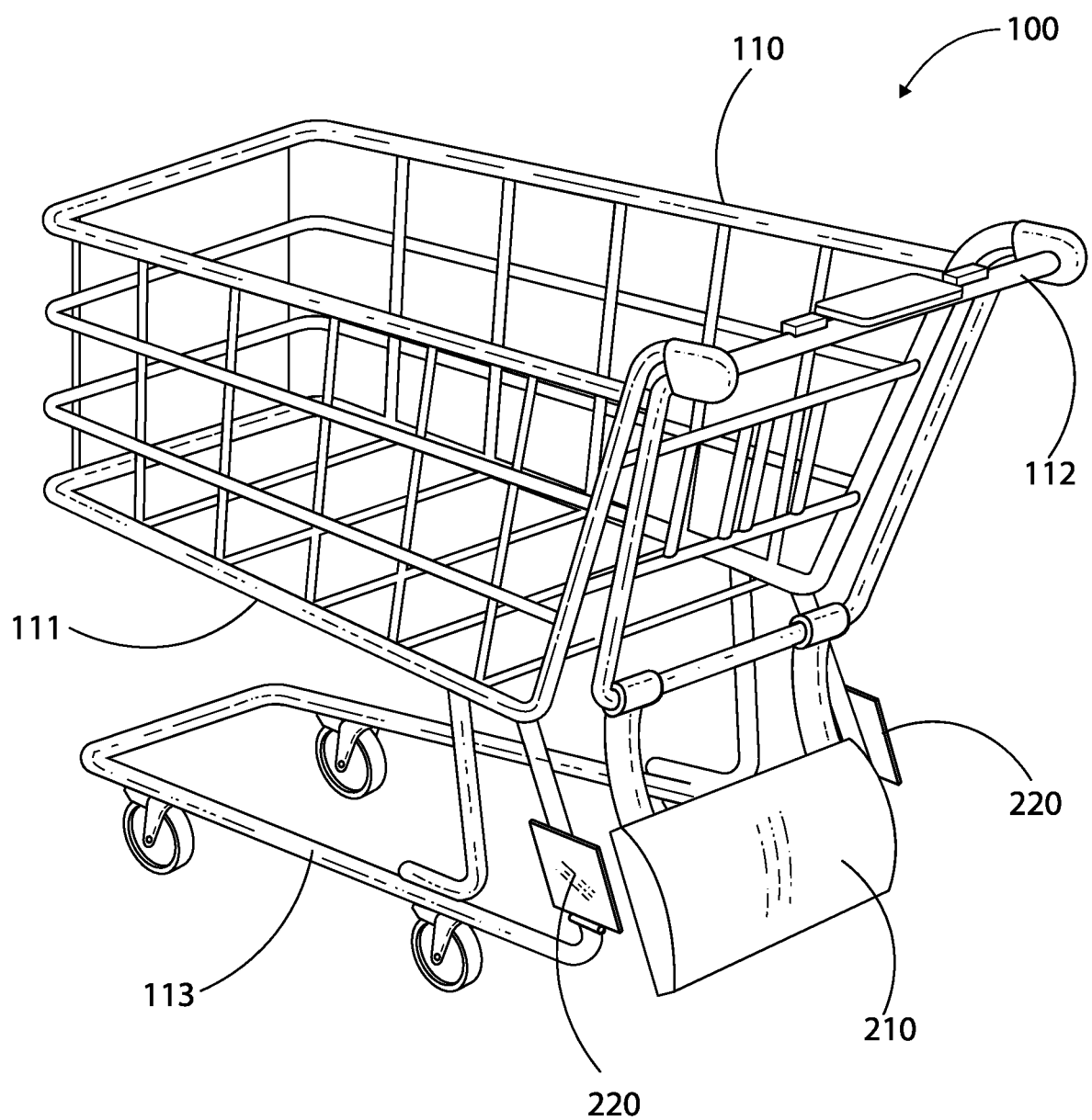
FIG. 2 is a rear perspective view of the motorized shopping cart and illustrating a fold-out seat in a folded position, and a pair of fold-out steps in a folded position, according to another embodiment of the present disclosure.
Figure 3:
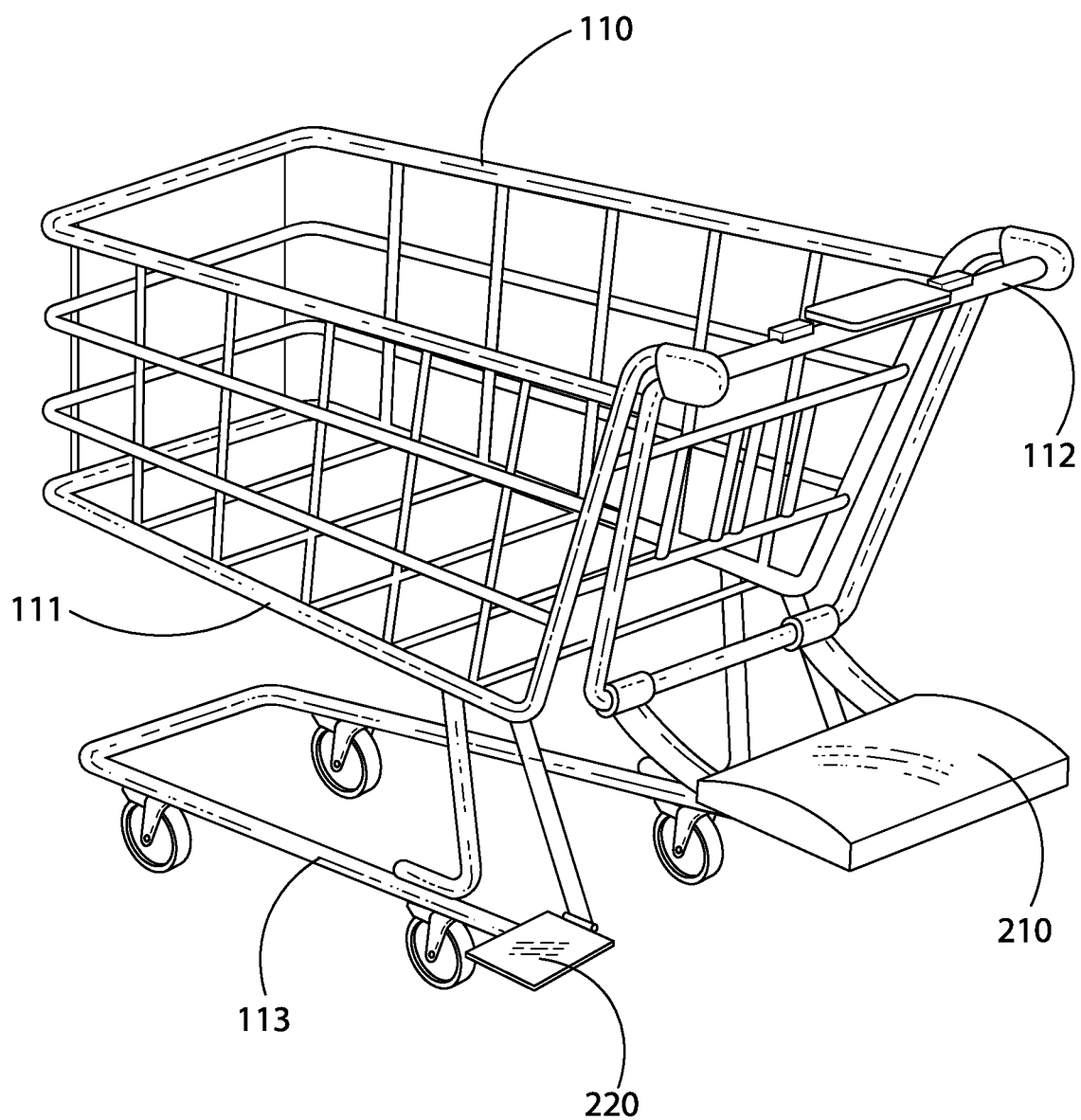
FIG. 3 is a rear perspective view of the motorized shopping cart and illustrating a fold-out seat in an unfolded position, and a pair of fold-out steps in an unfolded position, according to another embodiment of the present disclosure.

Referring more specifically to FIGS. 2-3, there is shown the motorized shopping cart 100 according to another embodiment wherein the motorized shopping cart 100 includes a fold-out seat 210 and at least one fold-out step 220. Particularly, as shown, the fold-out seat 210 may be pivotably attached at the rear side of the basket 111 and configured to move between a folded seat position, wherein the fold-out seat 210 is folded at the rear of the shopping cart 110 toward an underneath of the basket 111; and an unfolded seat position, wherein the fold-out seat 210 is unfolded at the rear side of the basket 111. As such, in the unfolded seat position, a user is able to sit on the shopping cart 110.

In some embodiments, the fold-out seat 210 may be height adjustable, either manually or automatically, to enable the user to adjust the seat relative to the shopping cart 110 such that they are able to clearly see over the shopping cart 110 when seated.

Similarly, the at least one fold-out step 220 may be pivotably attached underneath the basket 111 and configured to move between a folded step position, wherein the at least one fold-out step 220 is folded underneath the basket 111 and directly above the wheels 121a, 121b, 121c, 121d; and an unfolded step position, wherein the at least one fold-out step 220 is folded out laterally from the shopping cart 110. As such, the user is able to utilize the step in the unfolded step position. For example, when the user is sat on the fold-out seat 210 in the unfolded seat position, the user may rest their legs on the at least one fold-out step 220. In some embodiments, the at least one fold-out step 220 may included a pair of fold-out steps 220 located opposite each other at lateral (i.e., left and right) sides of the shopping cart 110.

Actuators (not illustrated) may be in communication with the fold-out seat 210 and the at least one fold-out step 220 to move the at least one fold-out step 220 and the fold-out seat 210 in and out of their respective folded and unfolded positions. For example, a seat drive button (not illustrated) and a step drive button (not illustrated) may be attached to the shopping cart 110 (e.g., at the handle 112) and configured to move the seat 210 and the step(s) 220 into their respective folded and unfolded positions. Further, one or more seat height adjusting buttons (not illustrated) may be provided for adjusting the height of the fold-out seat 210.

Figure 4:
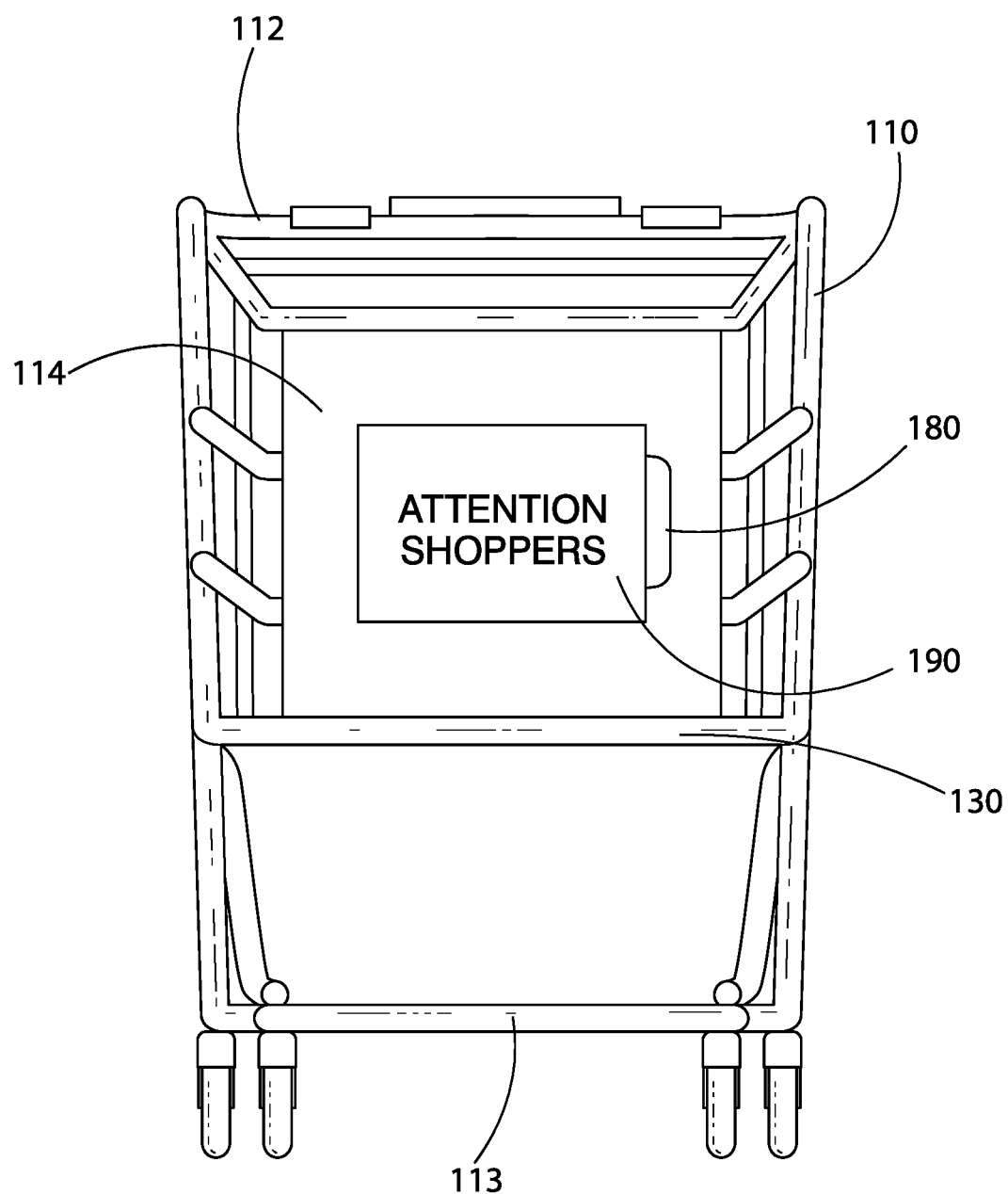
FIG. 4 is a front view of the motorized shopping cart including a display screen, according to an embodiment of the present disclosure.
Figure 5:
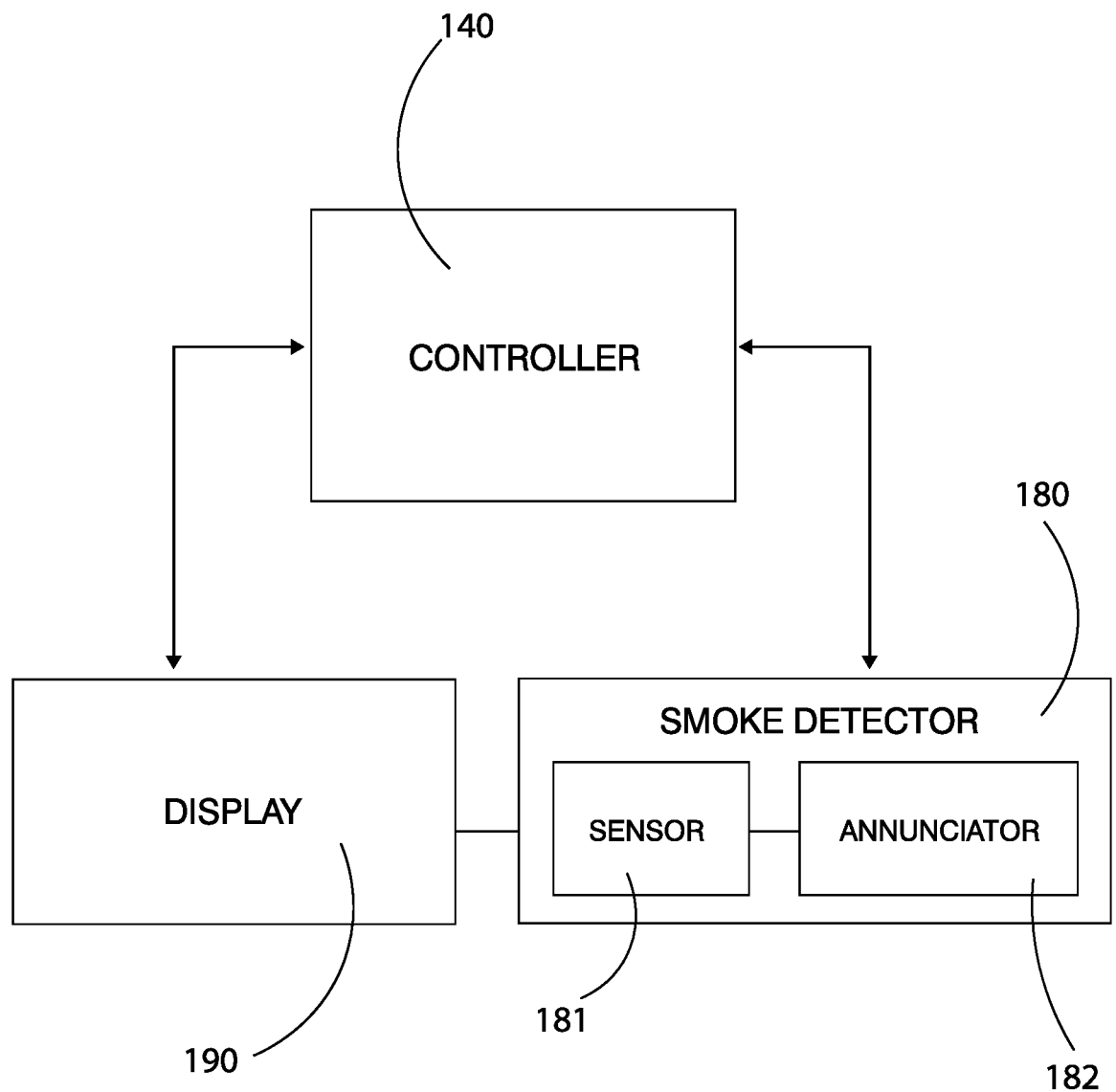
FIG. 5 is a block diagram of the display screen, a controller and a smoke detector, according to an embodiment of the present disclosure.

Referring now also to FIGS. 4-5, with reference still to FIGS. 1-3, there, is shown in FIG. 4 a front view of the motorized shopping cart 100 including a display screen; and in FIG. 5, there is shown a block diagram illustrating the display screen 190 and a smoke detection module 180.

As shown, the display screen 190 may be attached to a front of the shopping cart 110. In some embodiments, the front of the shopping cart 110 may include a front panel 114 attached thereto, to which the display screen 190 is mounted. The display screen 190 may be particularly configured to display information to the user and/or other shoppers. For example, the display screen 190 may display advertisements, announcements, and the like.

As shown in FIG. 1 and FIG. 4, the smoke detection module 180 may be attached to the front side of the shopping cart 110. Particularly, the smoke detection module 180 may be mounted to the display screen 190 or attached to the front panel 114 of the shopping cart 110. As shown in FIG. 5, the smoke detection module 180 may include one or more smoke sensors 181 configured to detect the presence of smoke, and an annunciator 182 configured to audibly and/or visually alert the user and other customers when smoke is detected.

In some embodiments, the smoke detection module 180 unit may be in communication with the display screen 190, such that the display screen 190 is able to also display alerts upon detection of the smoke, illuminate in the event of limited visibility due to smoke, etc. For example, as shown in FIG. 5, a controller 140 may be in communication with the smoke detection module 180 unit to receive signals therefrom. Once the controller 140 receives signals indicating that smoke is detected, the controller 140 may cause the display screen 190 to act accordingly.

Figure 6:
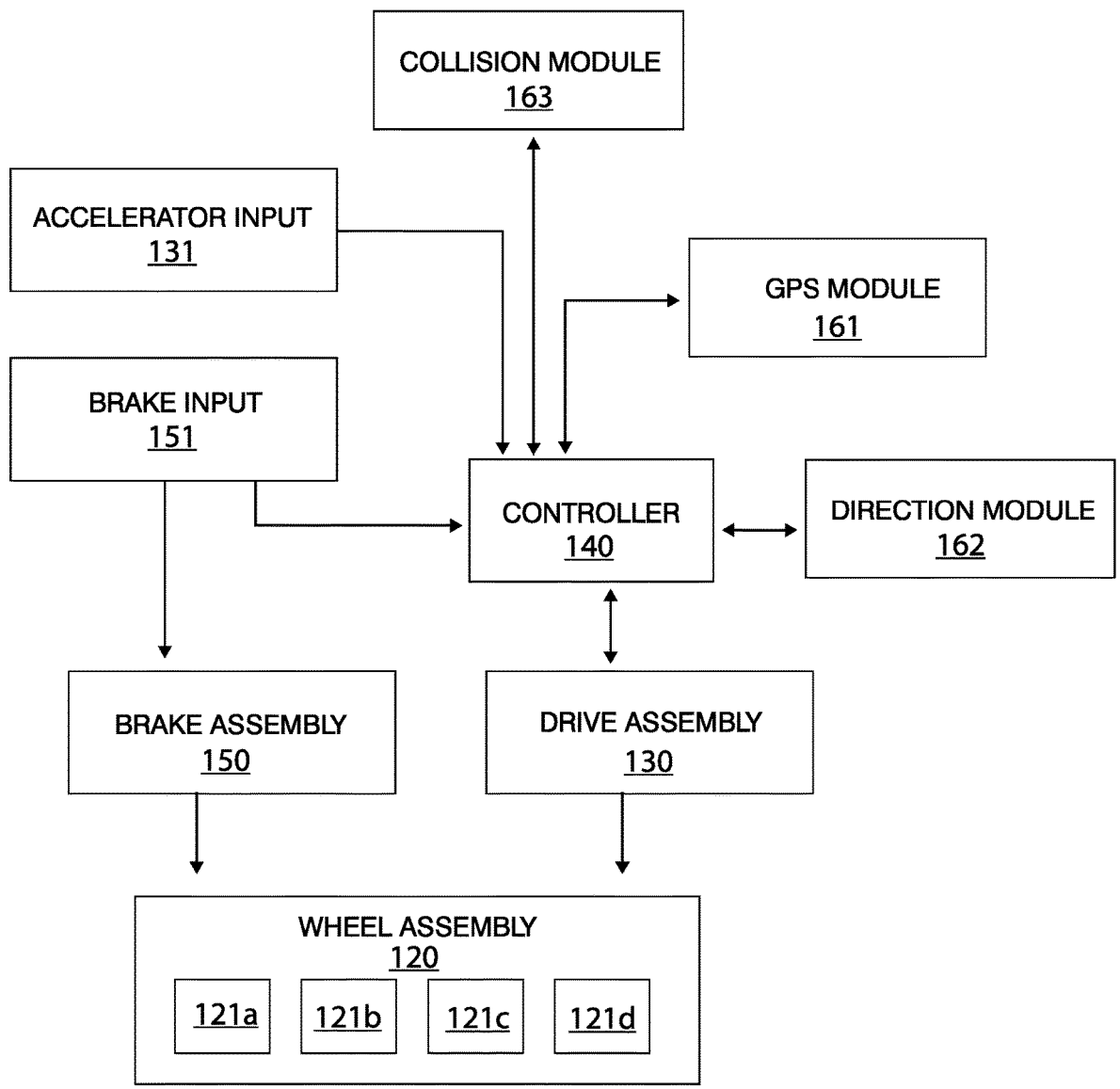
FIG. 6 is a block diagram of components of the motorized shopping cart that enable and disable movement thereof, according to an embodiment of the present disclosure.
Figure 7:
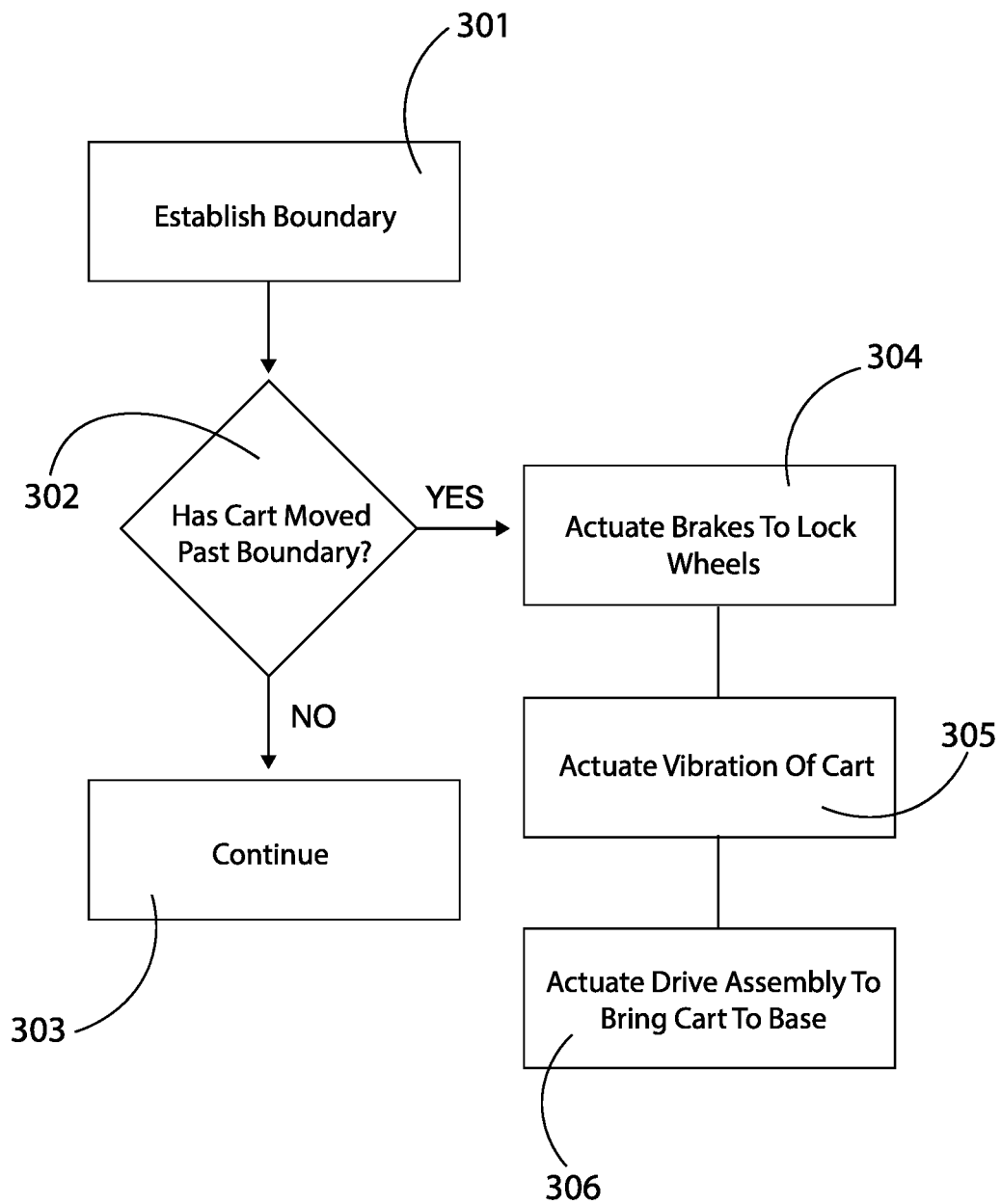
FIG. 7 is an example logic diagram to determine whether the shopping cart moved past a predetermined boundary, according to an embodiment of the present disclosure.
Figure 8:
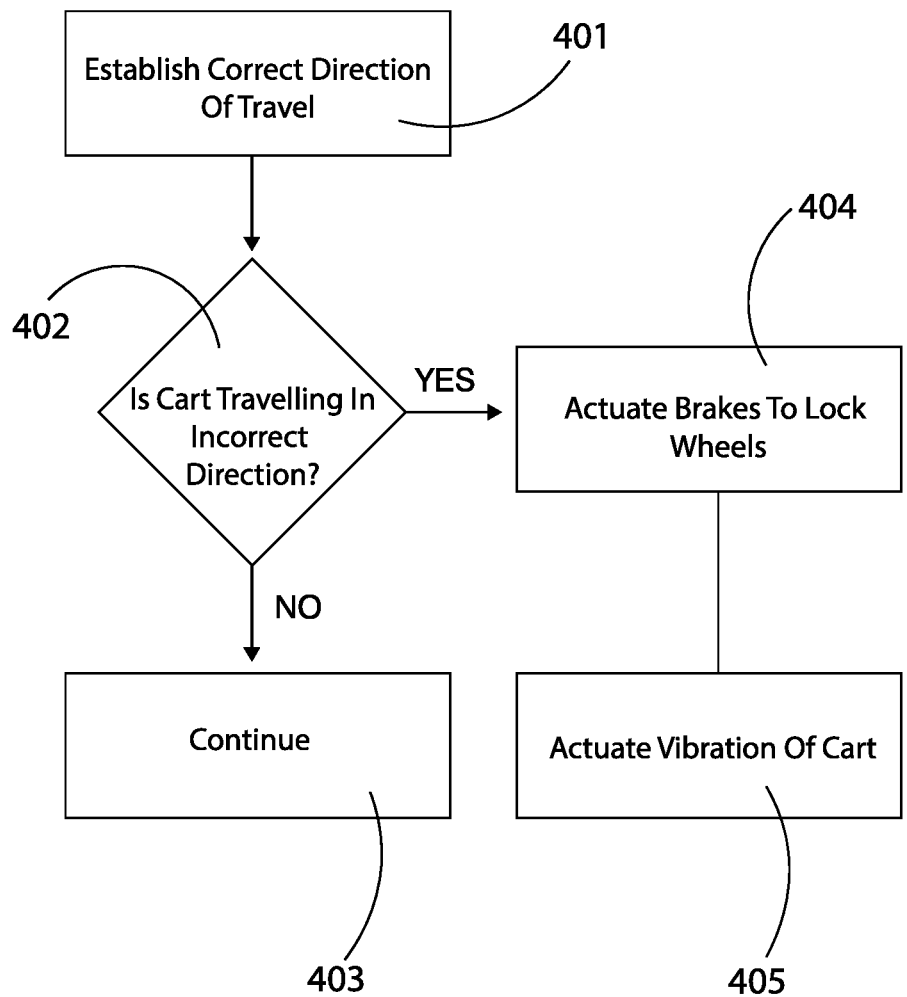
FIG. 8 is an example logic diagram to determine whether the shopping cart is moving in an incorrect direction, according to an embodiment of the present disclosure.

Referring now to FIGS. 6-8, and still with reference to FIGS. 1-3, there is shown block diagrams illustrating components that enable and disable movement of the shopping cart 110; particularly, a drive assembly 130, the controller 140 as discussed above, a brake assembly 150, a GPS component 161, a direction sensing module 162, and a feedback module 170.

As shown here, the drive assembly 130 may be in communication with the wheel assembly 120 and configured to drive the wheel assembly 120 and propel the shopping cart 110. Particularly, the drive assembly 130 may include one or more motors in communication with the axles 122a, 122b, 122c, 122d of each wheel 121a, 121b, 121c, 121d. The controller 140 may be coupled to the shopping cart 110 and configured to actuate the drive assembly 130 to drive the wheel assembly 120.

Further, the brake assembly 150 may be in communication with the wheel assembly 120 and configured to lock the wheels 121a, 121b, 121c, 121d to cease movement of the shopping cart 110. The controller 140 may be configured to automatically cause acceleration and deceleration of the wheel assembly 120, via manipulation of power supply to the drive assembly 130. The controller 140 may also be configured to automatically cause the locking of the wheels 121a, 121b, 121c, 121d, by actuating the brake assembly 150.

Further, in some embodiments, braking, acceleration and, in some embodiments, deceleration may be actuated manually by user input. For example, in some embodiments, the brake assembly 150 may include a manual brake input 151, such as (but not limited to) a button. In some embodiments, the brake button 151 may be attached to the handle 112 of the motorized shopping cart 100 (as shown in FIG. 1). As such, when using the motorized shopping cart 100, the user may press the brake button 151 to manually brake the wheel assembly 120.

Similarly, an accelerator input 131 may be attached at the handle 112 and in communication with the drive assembly 130. In some examples, the accelerator input 131 may include an accelerator button 131, enabling a user to press the accelerator button 131 to cause movement and acceleration of the wheel assembly 120.

In some embodiments, both manual and automatic braking, acceleration and deceleration may be facilitated by the controller 140. Particularly, the brake button 151 and the accelerator button 131 button may each include sensors (not illustrated) connected to the controller 140 configured to sense manual input (i.e., pressing of the button 131 or 151). Upon sensing the input, the sensors then send signals to the controller 140 and the controller 140 causes either braking, acceleration or deceleration of the wheel assembly 120 (dependent on which button [131 or 151] is pressed).

In some embodiments, sensors may be mounted to the motorized shopping cart 100 configured to sense conditions relating to, or ambient to, the shopping cart 110. Upon detection of particular conditions, the controller 140 may be configured to activate at least one response measure, such as braking, deceleration, activating vibration, and the like.

The feedback module 170 may be coupled to the shopping cart 110 and configured to haptically alert the user. For example, the feedback module 170 may include a vibration module configured to vibrate at least a portion of the shopping cart 110. The feedback module 170 may be located on the shopping cart 110 at a location that maximizes the vibration felt by the user (for example, the handle 112).

The GPS module 161 may be configured to determine the location of the shopping cart 110 relative to a predetermined boundary. FIG. 7 illustrates example decision logic to determine whether the shopping cart 110 moves past the predetermined boundary. In some embodiments, the predetermined boundary may be an exterior boundary of a store, such as (but not limited to) a perimeter of a parking lot. As such, as demonstrated in block 301 the predetermined boundary may be 'established' by programming the controller 140 with a geofence based on GPS coordinates. If the shopping cart 110 does not move past the boundary, normal operation of the shopping cart 110 continues (as shown in block 303).

The GPS module 161 may send one or more signals to the controller 140, and once the controller 140 determines that the shopping cart 110 has moved past the predetermined boundary, (block 302) the controller 140 activates response measures. Particularly, the controller 140 causes the brake assembly 150 to lock the wheel assembly 120 to cease movement of the shopping cart 110 and actuate vibration of the shopping cart 110 via the feedback module 170, as shown in blocks 304 and 305.

Further, in some embodiments, upon receipt of the signals from the GPS module 161, the controller 140 may be configured to actuate the drive assembly 130 to cause movement of the wheel assembly 120 to 'retrieve' the shopping cart 110 and transport it back to a base station (for example, a shopping cart return station, an area inside the store, etc.), as demonstrated in block 306.

Referring now to FIG. 8, with reference still to FIG. 6, the direction sensing module 162 may be configured to determine a direction of travel of the shopping cart 110 to determine whether the shopping cart 110 is traveling according to a correct predetermined direction of travel. Particularly, the predetermined direction of travel may include a correct side of each aisle in a store. For example, if the store has a one way travel system for each aisle this may first be programmed into the controller 140, as shown in block 401. The controller 140, using data from the direction sensing module 162, may determine whether the cart is travelling in an incorrect direction, as shown in block 402; and if it is not, the shopping cart 110 continues (block 403).

The direction sensing module 162 may send one or more signals to the controller 140 which the controller 140 uses to determine when the shopping cart 110 is travelling down the aisle the wrong way (for example by comparing the predetermined direction of travel with actual direction of travel). Once it is determined that the shopping cart 110 is travelling down the aisle the wrong way, the controller 140 again activates response measures.

Particularly, the controller 140 may cause the brake assembly 150 to lock the wheel assembly 120 to cease movement of the shopping cart 110 and simultaneously actuate vibration of the shopping cart 110 via the feedback module 170, as shown in blocks 404 and 405. The direction sensing module 162 may include (but is not limited to) one or more orientation sensors (e.g., gyroscopes) to determine the direction of travel of the shopping cart 110. In some embodiments, the determination as to the direction of travel may also be aided by data collected from the GPS module 161.

Further, other sensors may be included in the shopping cart 110. For example, referring back to FIG. 6, as shown, the shopping cart 110 may include a collision module 163 including one or more crash detection sensors such as (but not limited to), proximity sensors, pressure sensors, contact sensors, etc. In this embodiment, the controller 140 may receive data from the collision module 163, determine whether a collision is imminent (with an object, other cart, person etc.), and activate one or more response measures for collision avoidance.

For example, the controller 140 may cause the brake assembly 150 to lock the wheel assembly 120 to cease movement of the shopping cart 110, thereby avoiding collision or minimizing impact of the collision. In another example, the controller 140 may decelerate speed of the shopping cart 110 (via manipulation of power supply to the drive assembly 130). In another example, the controller 140 may be configured to control direction of the wheel assembly 120, causing the shopping cart 110 to change direction and/or move around the collision.

The figures may not be to scale, and certain aspects might be intentionally accentuated or downplayed to highlight specific components. Consequently, the precise structural and operational elements shown and discussed here, along with any specific amalgamation of these elements, should not be seen as confining but rather as an illustrative guide for teaching one skilled in the art to employ the invention. Common but well understood elements that are useful or necessary in a commercially feasible embodiment are often not depicted in order to facilitate a less obstructed view of these various embodiments of the present invention.

It should be understood by one of skill in the art that the disclosed invention is described here in a few exemplary embodiments of many. No particular terminology or description should be considered limiting on the disclosure or the scope of any claims issuing therefrom.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the relevant patent office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A motorized shopping cart comprising:
   a shopping cart including a basket, a handle at a rear side of the basket and a base below the basket;
   a wheel assembly including four wheels attached at each corner of the base for propelling the shopping cart;
   a smoke detection module coupled to the shopping cart;
   a display screen coupled to the shopping cart and configured to display information;
   a drive assembly in communication with the wheel assembly and configured to drive the wheel assembly to propel the shopping cart;
   a brake assembly in communication with the wheel assembly, the brake assembly configured to lock the wheel assembly to cease movement of the shopping cart;
   a feedback module coupled to the shopping cart and configured to vibrate at least a portion of the shopping cart;
   a GPS module coupled to the shopping cart and configured to determine a location of the shopping cart relative to a predetermined boundary;
   a direction sensing module coupled to the shopping cart and configured to determine a direction of travel of the shopping cart through a store; and
   a controller coupled to the shopping cart and configured to receive data from the GPS module and the direction sensing module, respectively, and in response to either one of movement of the shopping cart past the predetermined boundary and incorrect direction of travel of the shopping cart, the controller is configured to simultaneously cause the brake assembly to lock the wheel assembly to cease movement of the shopping cart and cause the feedback module to vibrate the at least said portion of the shopping cart.

2. The motorized shopping cart of claim 1, wherein, in response to movement of the shopping cart past the predetermined boundary, the controller is further configured to actuate the drive assembly to cause movement of the wheel assembly and transport the shopping cart back to a base station.

3. The motorized shopping cart of claim 2, further comprising a collision module coupled to the shopping cart and configured to detect an imminent collision; and
   wherein the controller is configured to receive data from the collision module and, in response to detection of an imminent collision, activate at least one response measure for collision avoidance.

4. The motorized shopping cart of claim 3, wherein the brake assembly includes a brake manual input attached to the handle of the shopping cart, the brake manual input enabling a user to manually cause braking of the wheel assembly.

5. The motorized shopping cart of claim 4, further comprising an accelerator input attached at the handle and in communication with the drive assembly, the accelerator input enabling the user to manually cause at least movement and acceleration of the shopping cart.

6. The motorized shopping cart of claim 1, wherein the information includes at least one of advertisements and store announcements.

7. The motorized shopping cart of claim 6, wherein the display screen is attached to the front side of the shopping cart.

8. The motorized shopping cart of claim 7, wherein the smoke detection module is mounted to the display screen.

9. A motorized shopping cart comprising:
   a shopping cart including a basket, a handle at a rear side of the basket and a base below the basket;
   a wheel assembly including four wheels attached at each corner of the base for propelling the shopping cart;
   a fold-out seat pivotably attached to the shopping cart toward the rear side of the basket, the fold-out seat configured to move between a folded seat position and an unfolded seat position, wherein in the unfolded seat position the fold-out seat is unfolded at the rear side of the basket and enables a user to sit thereon;

at least one fold-out step pivotably attached to the shopping cart underneath the basket, the at least one fold-out step configured to move between a folded step position and an unfolded step position, wherein in the unfolded step position the at least one fold-out step is unfolded at a side of the basket, enabling the user to place a foot thereon;

a smoke detection module coupled to the shopping cart;

a display screen coupled to the shopping cart and configured to display information;

a drive assembly in communication with the wheel assembly and configured to drive the wheel assembly to propel the shopping cart;

a brake assembly in communication with the wheel assembly, the brake assembly configured to lock the wheel assembly to cease movement of the shopping cart;

a feedback module coupled to the shopping cart and configured to vibrate at least a portion of the shopping cart;

a GPS module coupled to the shopping cart and configured to determine a location of the shopping cart relative to a predetermined boundary;

a direction sensing module coupled to the shopping cart and configured to determine a direction of travel of the shopping cart through a store; and a controller coupled to the shopping cart and configured to receive data from the GPS module and the direction sensing module, respectively, and in response to either one of movement of the shopping cart past the predetermined boundary and incorrect direction of travel of the shopping cart, the controller is configured to simultaneously cause the brake assembly to lock the wheel assembly to cease movement of the shopping cart and cause the feedback module to vibrate the at least said portion of the shopping cart.

10. The motorized shopping cart of claim 9, wherein the at least one fold-out step includes a pair of fold-out steps, each attached at opposing sides of the shopping cart.

11. The motorized shopping cart of claim 9, wherein, in response to movement of the shopping cart past the predetermined boundary, the controller is further configured to actuate the drive assembly to cause movement of the wheel assembly and transport the shopping cart back to a base station.

12. The motorized shopping cart of claim 11, further comprising a collision module coupled to the shopping cart and configured to detect an imminent collision;

wherein the controller is configured to receive data from the collision module and, in response to detection of an imminent collision, activate at least one response measure for collision avoidance.

13. The motorized shopping cart of claim 12, wherein the brake assembly includes a brake manual input attached to the handle of the shopping cart, the brake manual input enabling a user to manually cause braking of the wheel assembly.

14. The motorized shopping cart of claim 13, further comprising an accelerator input attached at the handle and in communication with the drive assembly, the accelerator input enabling the user to manually cause at least movement and acceleration of the shopping cart.

15. The motorized shopping cart of claim 9, wherein the information includes at least one of advertisements and store announcements.

16. The motorized shopping cart of claim 15, wherein the display screen is attached to the front side of the shopping cart.

17. The motorized shopping cart of claim 16, wherein the smoke detection module is mounted to the display screen.

18. A motorized shopping cart comprising:

a shopping cart including a basket, a handle at a rear side of the basket and a base below the basket;

a wheel assembly including four wheels attached at each corner of the base for propelling the shopping cart;

a smoke detection module coupled to the shopping cart;

a display screen coupled to a front side of the shopping cart and configured to display at least one of advertisements and store announcements;

a drive assembly in communication with the wheel assembly and configured to drive the wheel assembly to propel the shopping cart;

a brake assembly in communication with the wheel assembly, the brake assembly configured to lock the wheel assembly to cease movement of the shopping cart;

a collision module coupled to the shopping cart and configured to detect an imminent collision;

a feedback module coupled to the shopping cart and configured to vibrate at least a portion of the shopping cart;

a GPS module coupled to the shopping cart and configured to determine a location of the shopping cart relative to a predetermined boundary;

a direction sensing module coupled to the shopping cart and configured to determine a direction of travel of the shopping cart through a store; and a controller coupled to the shopping cart and configured to receive data from the GPS module, the direction sensing module and the collision module, respectively, and in response to either one of movement of the shopping cart past the predetermined boundary, incorrect direction of travel of the shopping cart and detection of an imminent collision, the controller is configured to at least: simultaneously cause the brake assembly to lock the wheel assembly to cease movement of the shopping cart and cause the feedback module to vibrate the at least said portion of the shopping cart; and wherein, in response to movement of the shopping cart past the predetermined boundary, the controller is further configured to actuate the drive assembly to cause movement of the wheel assembly and transport the shopping cart back to a base station.

19. The motorized shopping cart of claim 18, further comprising a fold-out seat pivotably attached to the shopping cart toward the rear side of the basket, the fold-out seat configured to move between a folded seat position and an unfolded seat position, wherein in the unfolded seat position the fold-out seat is unfolded at the rear side of the basket and enables a user to sit thereon.

20. The motorized shopping cart of claim 19, further comprising at least one fold-out step pivotably attached to the shopping cart underneath the basket, the at least one fold-out step configured to move between a folded step position and an unfolded step position, wherein in the unfolded step position the at least one fold-out step is unfolded at a side of the basket, enabling the user to place a foot thereon.

* * * * *